United States Patent
Rehfuß

(10) Patent No.: US 11,996,568 B2
(45) Date of Patent: May 28, 2024

(54) TRACTION BATTERY DEVICE WITH EXTINGUISHING APPARATUS

(71) Applicant: Dr. Ing. h.c. F. Porsche Aktiengesellschaft, Stuttgart (DE)

(72) Inventor: Benjamin Rehfuß, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 16 days.

(21) Appl. No.: 17/363,195

(22) Filed: Jun. 30, 2021

(65) Prior Publication Data
US 2022/0006144 A1 Jan. 6, 2022

(30) Foreign Application Priority Data
Jul. 1, 2020 (DE) ...................... 10 2020 117 270.2

(51) Int. Cl.
*H01M 50/14* (2021.01)
*A62C 3/07* (2006.01)
(Continued)

(52) U.S. Cl.
CPC ............. *H01M 50/14* (2021.01); *A62C 3/07* (2013.01); *A62C 3/16* (2013.01); *A62C 5/02* (2013.01); *H01M 10/486* (2013.01); *H01M 2220/20* (2013.01)

(58) Field of Classification Search
CPC ....... H01M 50/14; H01M 10/486; A62C 3/07; A62C 3/16; A62C 5/02; B60L 2240/545
See application file for complete search history.

(56) References Cited

U.S. PATENT DOCUMENTS

| | | | | |
|---|---|---|---|---|
| 4,390,069 A | * | 6/1983 | Rose, Jr. ................. | A62C 5/02 252/3 |
| 5,009,244 A | * | 4/1991 | Grindley ................. | A62C 5/02 137/512.2 |

(Continued)

FOREIGN PATENT DOCUMENTS

| | | |
|---|---|---|
| CN | 106823199 A | 6/2017 |
| CN | 206295526 U | 7/2017 |

(Continued)

OTHER PUBLICATIONS

"Traction Battery Review", Engineers Edge, <https://www.engineersedge.com/battery/traction_battery.htm> (Year: 2006).*

(Continued)

*Primary Examiner* — Matthew T Martin
*Assistant Examiner* — Jessie Walls-Murray
(74) *Attorney, Agent, or Firm* — Buchanan Ingersoll & Rooney PC

(57) ABSTRACT

A traction battery device for an at least partially electrically driven motor vehicle includes at least one traction battery with at least one battery housing for housing battery modules and/or battery cells and at least one extinguishing apparatus for automatically carrying out an extinguishing process in an extinguishing situation. An extinguishing agent can be introduced into the battery housing with the extinguishing apparatus via at least one feed device. In this context, the extinguishing apparatus has at least one extinguishing-agent-generating device which, in the case of an extinguishing situation, is suitable for combining, and is designed to combine, at least two spatially separate extinguishing agent components in a controlled fashion and to mix them to form an extinguishing agent which can be extinguished and which can be introduced into the battery housing via the feed device.

18 Claims, 2 Drawing Sheets

(51) Int. Cl.
*A62C 3/16* (2006.01)
*A62C 5/02* (2006.01)
*H01M 10/48* (2006.01)

(56) References Cited

U.S. PATENT DOCUMENTS

| | | | |
|---|---|---|---|
| 10,559,858 B2 | 2/2020 | Goitsuka et al. | |
| 2007/0246230 A1* | 10/2007 | Roberts | A62C 5/02 169/14 |
| 2011/0000801 A1* | 1/2011 | Hirakawa | A62C 3/07 206/223 |
| 2012/0168184 A1* | 7/2012 | Enk, Sr. | A62C 5/024 169/14 |
| 2013/0037277 A1* | 2/2013 | Henry | B01F 25/45211 169/14 |
| 2013/0264073 A1 | 10/2013 | Ling | |
| 2018/0370373 A1 | 12/2018 | Hooper et al. | |
| 2019/0168037 A1* | 6/2019 | Lian | A62C 37/04 |

FOREIGN PATENT DOCUMENTS

| | | | | |
|---|---|---|---|---|
| CN | 107398049 A | 11/2017 | | |
| CN | 206991502 U | 2/2018 | | |
| CN | 108695469 A | 10/2018 | | |
| CN | 110193154 A * | 9/2019 | | A62C 3/16 |
| DE | 102012214262 A1 | 2/2014 | | |
| DE | 202014007301 U1 | 12/2015 | | |
| DE | 202019102367 U1 | 5/2019 | | |
| JP | 2002360720 A | 12/2002 | | |
| JP | 2014144033 A | 8/2014 | | |
| JP | 2018133291 A | 8/2018 | | |
| WO | WO-2007001212 A2 * | 1/2007 | | A62C 5/002 |

OTHER PUBLICATIONS

Baelz; "2-Way vs 3-Way Valves: Which Type is Right for You?", Baelz North America, Oct. 10, 2018, <https://info.baelzna.com/blog/2-way-vs-3-way-valves> (Year: 2018).*
"Chemical and mechnical type portable foam fire extinguishers" Machinery Spaces, <http://www.machineryspaces.com/foam-type-portable-fire-extinguisher.html> (Year: 2014).*
Chinese Office Action for Chinese Application No. 202110711682.7, dated Jul. 5, 2022, with translation, 16 pages.
Japanese Notice of Reasons for Refusal for Japanese Application No. 2021-102100, dated Jul. 6, 2022, 2 pages.
Chinese Office Action for Chinese Application No. 2021107116827, dated Mar. 31, 2023, 11 pages.

* cited by examiner

TRACTION BATTERY DEVICE WITH EXTINGUISHING APPARATUS

CROSS-REFERENCE TO RELATED APPLICATION

This application claims priority to German Patent Application No.: 10 2020 117 270.2, filed Jul. 1, 2020, the content of such application being incorporated by reference herein in its entirety.

FIELD OF THE INVENTION

The present invention relates to a traction battery device for an at least partially driven motor vehicle with at least one traction battery and with at least one battery housing and with at least one extinguishing apparatus for automatically carrying out an extinguishing process in an extinguishing situation. At least one extinguishing agent can be introduced into the battery housing with the extinguishing apparatus via at least one feed device.

BACKGROUND OF THE INVENTION

Traction batteries for electric vehicles or hybrid vehicles generally have a particularly high energy density. When accidents or operational faults occur, the battery may overheat and start to burn or even explode. It is therefore advantageous to equip traction batteries with an extinguishing apparatus for firefighting. For example, such an extinguishing apparatus has become known from DE 10 2012 214 262 A1, which is incorporated herein by reference.

SUMMARY OF THE INVENTION

Described herein is an improved possible way of firefighting with respect to a traction battery. In particular, the solution is to function particularly reliably in the case of a fire, and at the same time is to be capable of being implemented in a way which is not structurally costly.

The traction battery according to aspects of the invention is provided for an at least partially electrically driven motor vehicle and in particular for an electric vehicle and/or a hybrid vehicle. The traction battery is in particular a high voltage battery. The traction battery device comprises at least one traction battery with at least one battery housing for housing battery modules and/or battery cells. In particular, the battery modules each comprise a multiplicity of battery cells. The traction battery comprises at least one extinguishing apparatus for automatically carrying out an extinguishing process in an extinguishing situation. With the extinguishing apparatus, at least one extinguishing agent can be introduced into the battery housing via at least one feed device. In this context, the extinguishing apparatus comprises at least one extinguishing means-generating device. The extinguishing means-generating device is suitable for combining and designed to combine, in the case of an extinguishing situation, at least two spatially separate extinguishing agent components in a controlled fashion, and is suitable for mixing, and designed to mix, them to form an extinguishing agent which is capable of extinguishing. The extinguishing agent can then be introduced into the battery housing via the feed device. In particular, the extinguishing agent is not generated until the extinguishing agent components are mixed.

Within the scope of the present invention, an extinguishing situation is understood to be not only a fire but also in particular overheating of the traction battery as well as damage to the traction battery in which substances could escape in an undesired fashion. According to aspects of the invention, introduction of the extinguishing agent into the battery housing is understood in particular as meaning that the extinguishing agent passes at least into one receptacle space, bounded by the battery housing, for the battery modules and/or battery cells.

The traction battery device according to aspects of the invention provides many advantages. A considerable advantage is provided by the extinguishing-agent-generating device with the spatially separate extinguishing agent components. An extinguishing agent which is generated in such a way is particularly suitable for firefighting with respect to traction batteries. In addition, the extinguishing apparatus can be implemented with such an extinguishing-agent-generating device in a way which is particularly economical in terms of installation space and not costly in structural terms. At the same time, the extinguishing apparatus, with the generation of extinguishing agent according to aspects of the invention, makes possible a particularly reliable protective measure against battery fire, which is also reliable over relatively long operating periods.

In one particularly preferred and advantageous configuration, an extinguishing foam can be produced from the extinguishing agent components. In particular, the extinguishing foam is not generated until the extinguishing agent components are mixed. The extinguishing-agent-generating device is preferably suitable for combining and mixing, and designed to combine and mix, extinguishing agent components to form an extinguishing foam. The feed device preferably comprises foam ducts and foam outlet units via which the extinguishing foam can be introduced into the battery housing. With the generation of extinguishing foam, the invention provides a means of fighting fires particularly reliably.

The extinguishing-agent-generating device preferably comprises at least one extinguishing tank. The extinguishing tank preferably comprises at least two extinguishing component spaces which are sealed with respect to one another and from the outside. In particular, the extinguishing tank comprises at least one extinguishing agent component space for each extinguishing agent component which is provided.

In particular, the extinguishing-agent-generating device comprises at least one controllable flow connection between the extinguishing agent component spaces. In particular, the extinguishing agent component spaces can be connected fluidically to the feed device, directly via the flow connection and/or indirectly. In particular, the flow connection can be controlled in such a way that the flow connection between the at least two extinguishing agent component spaces which are sealed with respect to one another can be opened in order to combine the extinguishing agent components and, in particular, move them further into the feed device.

In one particularly preferred and advantageous development, the extinguishing-agent-generating device comprises at least one mixing space for the selective mixing of the extinguishing agent components. The mixing space is preferably sealed with respect to the extinguishing agent component spaces. The mixing space can preferably be connected to the extinguishing agent component spaces in a controlled fashion (in particular by means of a control device). The mixing space can be preferably connected to the feed device with a flow connection and/or fluidically (for example via at least one valve device), so that the extinguishing agent which is capable of extinguishing can be discharged via the feed device. In particular, the mixing space has at least one line for discharging the extinguishing agent which is capable of extinguishing. In particular, the line has a flow connection to the feed device.

In particular, the mixing space constitutes a separate space. In particular, the mixing space is closed off from the extinguishing agent component spaces and can preferably be fluidically connected to the extinguishing agent component spaces only via the valve devices described below. In particular, the extinguishing agent which is capable of extinguishing, and preferably the extinguishing foam, are produced in the mixing space.

It is advantageous and preferred that the extinguishing agent component spaces can each be fluidically connected to the mixing space by means of at least one controllable valve device. In particular, the valve devices can be controlled by means of a control device. It is also preferred that the fluidic connection between the extinguishing agent component spaces runs via the mixing space and particularly preferably runs only via the mixing space. It can therefore be reliably ensured that all that is necessary is to open the valve device, in order to combine the extinguishing agent components and initiate the extinguishing process. The valve devices provide, in particular, the controllable flow connection, described above, between the extinguishing agent components.

The mixing space preferably comprises at least one pipe-like mixing section for generating selective eddying for mixing the extinguishing agent components. The mixing section can also be designed to generate a different type of mixing of fluids. The mixing section is preferably embodied as a mixing pipe or comprises at least one such pipe. This provides reliable and particularly prompt generation of the extinguishing agent.

At least one controllable valve device is respectively arranged for (all) the extinguishing agent component spaces provided, at both ends of the mixing section. The two extinguishing agent components preferably flow toward one another from both ends of the mixing section. At least one line for discharging extinguishing agent which is capable of extinguishing is arranged along the mixing section.

In one particularly preferred and advantageous configuration, the mixing space is arranged within the extinguishing tank. In particular, the mixing space is surrounded completely by the extinguishing tank. In particular, the mixing space is arranged concentrically or in a concentric manner within the extinguishing tank. In particular, the extinguishing tank is embodied in the manner of a pipe. In particular, a controllable flow connection and preferably the controllable valve devices are also arranged within the extinguishing tank. This provides a configuration of the extinguishing-agent-generating device which is particularly compact and at the same time particularly well protected against external influences and, for example, against unexpected events.

In particular, the extinguishing tank is provided by a pipe or comprises at least one such pipe. The pipe is closed off, in particular, at the ends and has at least one inner dividing wall in order to provide the two extinguishing agent component spaces. In particular, the mixing space is arranged at least partially within this wall. In particular, the mixing space is surrounded by at least one wall which extends at least in certain sections through the inner dividing wall of the extinguishing tank.

In particular, the mixing space extends at least partially into one of the extinguishing agent component spaces. In particular, the mixing space extends with in each case one half into in each case one of the extinguishing agent component spaces. In particular, the parts which extend into the extinguishing agent component spaces are each assigned at least one valve device so that the extinguishing agent component can flow from the respective extinguishing agent component space, via the valve device, into that part of the mixing space which extends into the extinguishing agent component space of said valve device.

In all the configurations, it is particularly preferred that an excess pressure is applied to the extinguishing agent component spaces. It is also possible that an excess pressure is not applied to the extinguishing agent component spaces, for example by opening a pressure source, until an extinguishing situation occurs. By means of the excess pressure in the extinguishing agent component spaces, the extinguishing agent components can preferably be transferred from said spaces into the mixing space and mixed there. By means of the excess pressure, the extinguishing agent which is capable of extinguishing can preferably be introduced into the battery housing via the feed device. In particular, the extinguishing agent components are fed along the mixing section by means of the excess pressure. Such a configuration is particularly advantageous since it is possible, for example, to dispense with pumps or other feed systems which are susceptible to faults.

It is particularly advantageous that the extinguishing-agent-generating device is attached to a housing wall and/or to a housing frame of the battery housing. The cover is preferably provided as such a housing wall. In particular, the extinguishing-agent-generating device is attached on one side to the battery housing. In particular, a front-side and/or longitudinal side arrangement of the extinguishing-agent-generating device is provided. However, it is also possible for the extinguishing-agent-generating device to be arranged on an upper side and/or on an underside of the battery housing. At least the extinguishing tank and/or the mixing space are particularly preferably arranged in such a way.

In one advantageous and preferred development, the feed device is preferably integrated into at least one housing wall and particularly preferably into a cover of the battery housing. In this context, the feed line comprises extinguishing agent ducts, in particular foam ducts and/or extinguishing agent outlet units, in particular foam outlet units, which are arranged in particular in the housing wall. The feed device is particularly preferably provided by such extinguishing agent ducts and extinguishing agent outlet units which are arranged in the housing wall, and preferably by the foam ducts and foam outlet units. A base plate and/or a side wall and/or an end wall can also be provided as a housing wall.

The extinguishing-agent-generating device is preferably arranged on that housing wall into which the feed device is also integrated. In particular the extinguishing-agent-generating device is arranged on the cover and the feed device is integrated into this cover. It is also possible and preferred that the extinguishing-agent-generating device is arranged on a housing wall which is adjacent to the cover, while the feed device is integrated into the cover.

In particular, the feed device can be supplied via at least one line with the extinguishing agent which is capable of extinguishing. In particular, the feed device is or can be connected fluidically to the extinguishing-agent-generating device and preferably to the mixing space via the line.

In particular, the extinguishing agent ducts are embodied in a meandering fashion. For example, a plurality of extinguishing agent ducts which run in a loop fashion through the housing wall are provided. Other profiles are also possible. In this context, the extinguishing agent ducts are connected in groups with collecting ducts. The extinguishing agent outlet units are embodied, in particular, as drilled holes. The extinguishing agent outlet units can also be embodied as nozzles or comprise such nozzles. It is possible that the extinguishing agent ducts and/or the extinguishing agent outlet units are formed in the housing wall. In particular, the extinguishing agent outlet units are arranged along the extinguishing agent ducts. For example, the extinguishing agent outlet units each comprise at least one through opening in a wall which surrounds the extinguishing agent duct.

In particular, the extinguishing agent which is capable of extinguishing, preferably the extinguishing foam, can be introduced selectively between the battery modules and/or the battery cells and/or into other cavities within the battery housing by means of the feed device. For this purpose, the extinguishing agent outlet units, preferably the foam outlet units, are in particular arranged above and/or below and/or laterally between the battery modules and/or battery cells. It is also possible to arrange further extinguishing agent ducts and/or extinguishing agent outlet units within the battery housing. In particular, the further extinguishing agent ducts and/or extinguishing agent outlet units have a flow connection to the feed device. This permits particularly selective distribution to, for example, particularly critical areas.

In all the configurations it is particularly preferred that the extinguishing apparatus comprises at least one control device. The control device is in particular suitable for monitoring, and designed to monitor, the operating state of the traction battery by means of at least one sensor means, and suitable for combining, and designed to combine, the extinguishing agent components by means of the extinguishing-agent-generating device when a critical operating state is detected, in order to generate the extinguishing agent. As result, the control device is preferably suitable for initiating, and designed to initiate, at the same time an extinguishing process which runs automatically and in particular autonomously, during which extinguishing process the extinguishing agent components are mixed to form an extinguishing agent which is capable of extinguishing, and the extinguishing agent which is capable of extinguishing then flows via the feed line into the battery housing in order to fight the fire. For example, when the critical operating state is detected, the control device opens only the valve devices in order to initiate the extinguishing process. Such a configuration permits reliable functioning of the extinguishing device even in critical operating states, for example after damage to the traction battery owing to an accident. In particular, the generation of the extinguishing agent which is capable of extinguishing also triggers its introduction into the battery housing.

The sensor means comprises for example at least one temperature sensor and/or at least one pressure sensor. In particular, at least one characteristic variable for the temperature and/or the pressure of the traction battery can be detected with the sensor means. A critical operating state is defined in particular by means of a specific temperature and/or a specific pressure. Other suitable sensors are also possible for monitoring the operating state of the traction battery.

BRIEF DESCRIPTION OF THE DRAWINGS

Further advantages and features of the present invention emerge from the exemplary embodiments which are explained below with reference to the appended figures.

In the figures.

DETAILED DESCRIPTION OF THE INVENTION

Figure 1:
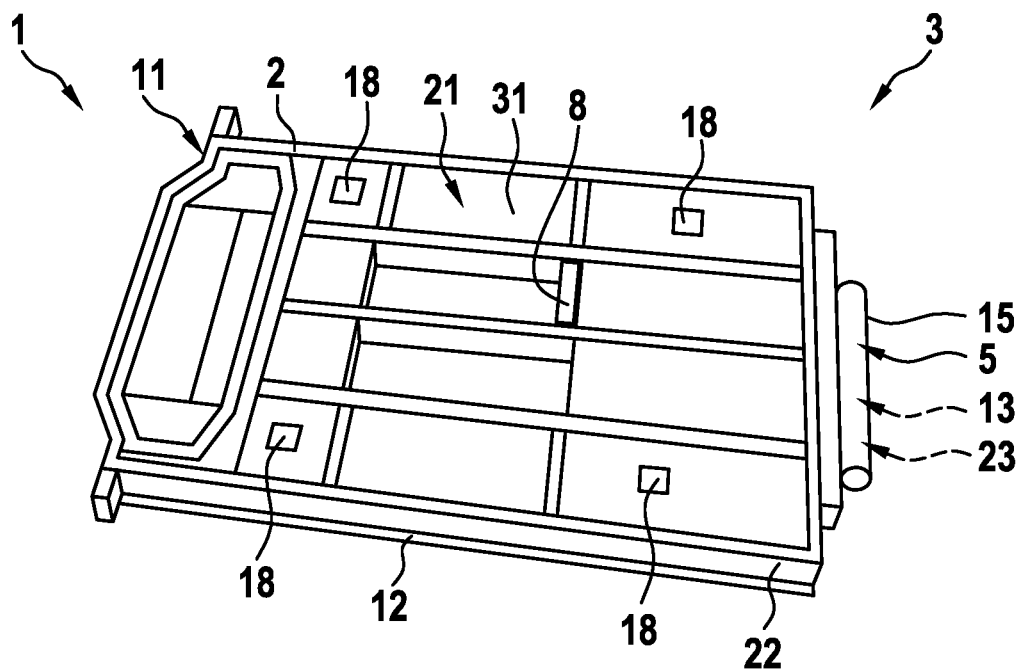
FIG. 1 shows a highly schematic illustration of a traction battery device according to aspects of the invention in a perspective view.

FIG. 1 shows a traction battery device 1 according to aspects of the invention with a traction battery 11, such as is used, for example, as a high voltage battery in an electric vehicle or hybrid vehicle. The traction battery 11 comprises a battery housing 2 which makes available a receptacle space for a plurality of battery modules 21. Battery cells 31 (which cannot be seen here) are accommodated in the battery modules 21. The traction battery 11 is embodied in the example shown here as an underfloor battery for a passenger car. 11.

The battery housing 2 comprises here a plurality of housing walls 12 as well as a housing frame 22 which runs around laterally. In order to close off the receptacle space, the battery housing 2 also comprises an upper housing wall 12 (not shown here) which is embodied as a cover 32 and is illustrated in more detail in FIG. 2.

The traction battery device 1 is equipped with an extinguishing device 3 for automatically carrying out extinguishing processes in extinguishing situations and, for example, in the case of accident induced damage or overheating. The extinguishing apparatus 3 is then described in more detail with reference to FIGS. 1 and 2.

In order to fight a fire with the extinguishing apparatus 3 use is made of an extinguishing agent 13 which is not shown here in more detail and is embodied as an extinguishing foam 33. The extinguishing foam 33 is introduced into the battery housing 2 via a feed device 4 which is integrated into the cover 32.

In order to detect critical operating states, the extinguishing apparatus 3 is equipped here with a control device 8 which continuously monitors the temperature and the pressure of the traction battery 11 via the sensor means 18. As soon as an abnormal or critical operating state or a crash situation with damage or destruction of the traction battery 11 is detected, the control apparatus 8 triggers the extinguishing process.

The extinguishing apparatus 3 is equipped with a extinguishing-agent-generating device 5 which combines two extinguishing agent components 23 arranged in an invisible fashion within the extinguishing tank 15, and mixes them and therefore generates the extinguishing foam 33. The extinguishing foam 33 is then selectively introduced into the battery housing 2 via the feed device 4 which is shown in FIG. 2.

Figure 2:
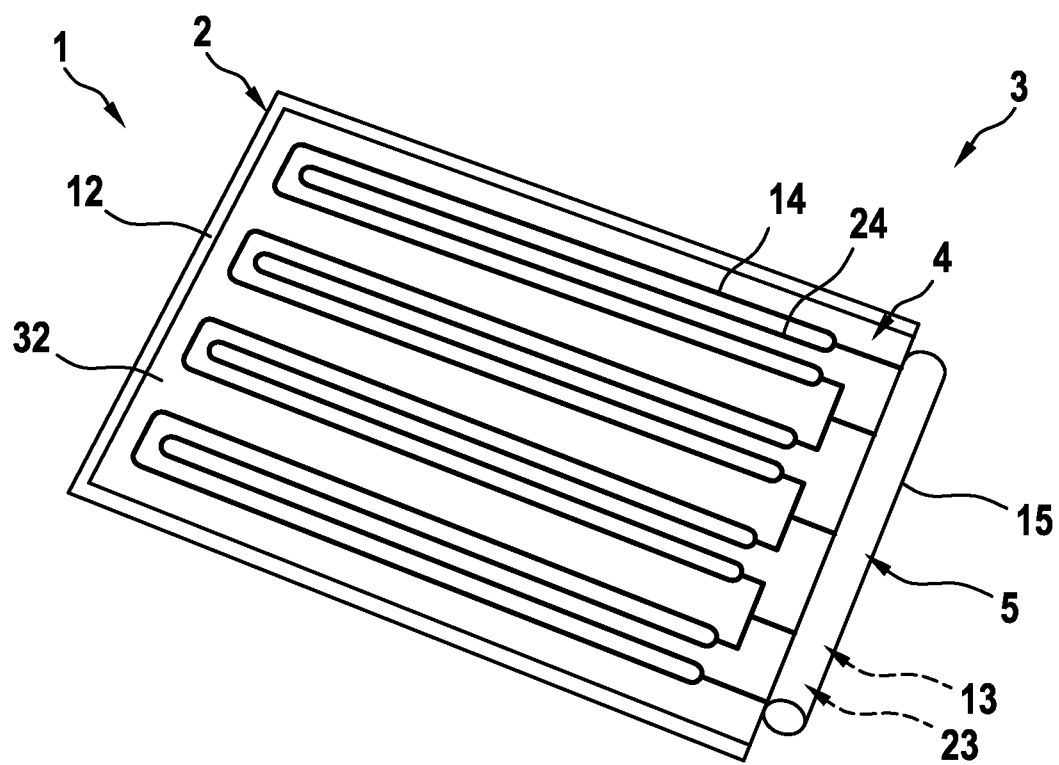
FIG. 2 shows an illustration of a detail of the traction battery device in a perspective view.

As shown in FIG. 2, the feed device 4 is integrated here into the cover 32 of the battery housing 2. For this purpose, a plurality of meandering extinguishing agent ducts, embodied as foam ducts 14, are arranged or formed in the cover. The feed device 4 additionally comprises here extinguishing agent outlet units or foam outlet units 24 which are designed for the use of extinguishing foam 33 and via which extinguishing foam 33 exits the foam ducts 14 into the interior of the battery 11. The foam outlet units 24 are arranged here along the foam ducts 14, so that spaces between the battery modules 21 and other cavities within the battery housing 2 can be reached selectively.

FIG. 1 shows the design in which the extinguishing-agent-generating device 5 is arranged with its extinguishing tank 15 on an end side of the battery housing 2. For example, the extinguishing tank 15 is for this purpose attached to an end-side housing wall 12 and/or to the housing frame 22.

FIG. 2 shows a design in which the extinguishing device 3 is attached with its extinguishing tank 15 to the cover 32. Such a design provides the advantage that the extinguishing-agent-generating device 5 and the feed device 4 are attached to a common component 32, which can be handled easily, and/or are integrated into said component. It is therefore possible to carry out retrofitting or also service work particularly easily.

Figure 3:
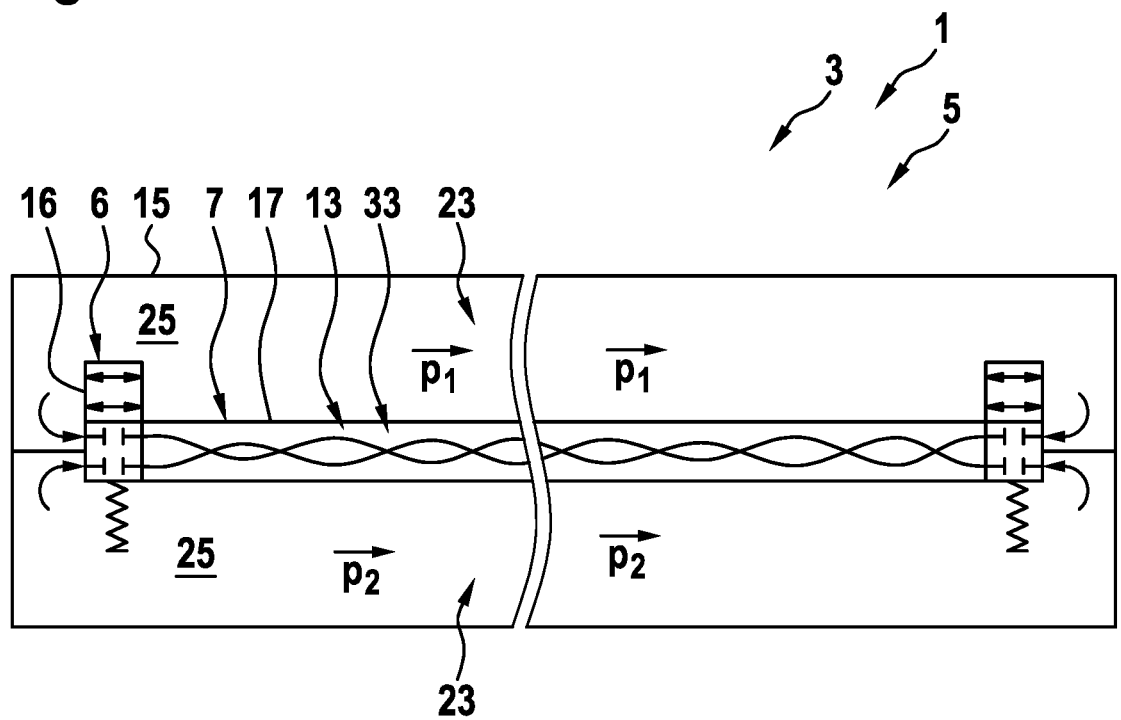
FIG. 3 shows an illustration of a detail of the traction battery device in a sectional front view.
Figure 4:
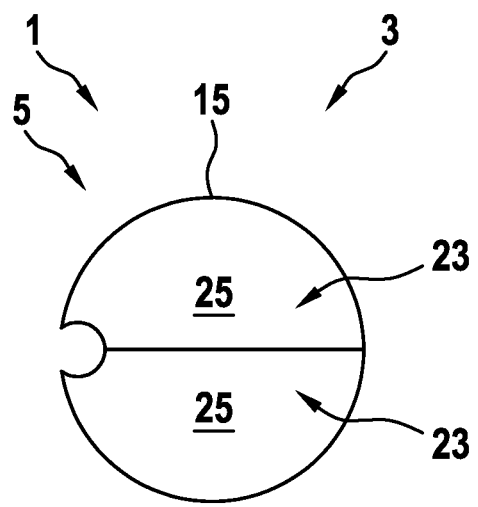
FIG. 4 shows an illustration of a detail of the traction battery device in a sectional side view.

FIGS. 3 and 4 illustrate in more detail the extinguishing-agent-generating device 5 of the traction battery device 1 which is described in more detail. The extinguishing-agent-generating device 5 has here a pipe-like extinguishing tank 15, which has two extinguishing agent component spaces 25 which are sealed with respect to one another and from the outside. In each case one of the extinguishing agent components 23 for producing the extinguishing foam 33 is arranged in the extinguishing agent component spaces 25.

The extinguishing agent components 23 are combined in a mixing space 7 via a flow connection 6 which can be controlled by the control device 8. The extinguishing foam 33 which is produced is then discharged from the mixing space 7 via a line (which cannot be seen here) and fed to the feed device 4. The mixing space 7 is embodied here as a mixing pipe and comprises a pipe-like mixing section 17.

The controllable flow connection 6 is provided here by a total of four controllable valve devices 16. In this context, in each case two valve devices 16 which are arranged at opposite ends of the mixing section 17 are provided for each extinguishing agent component space 25. As soon as the control device 8 opens the valve devices 16, the extinguishing agent components 23 flow out of their respective extinguishing agent component space 25 into the mixing space 7. For prompt and thorough mixing, selective eddying of the inflowing extinguishing agent components 23 is generated with the mixing section 17.

If the sensor means 18 indicate, for example, a critical temperature just before a battery fire, the control device 8 opens the valve devices 16 which embodied, for example, as injector valves. The extinguishing agent components 23 from the extinguishing agent component spaces 24 to which pressure has been applied then flow into the mixing space 7 and are mixed together along the mixing section 17 so that the extinguishing foam 33 is produced. The latter is selectively distributed in the entire traction battery 11 via the distribution system of the feed device 4 in the cover 32, and said extinguishing foam 33 flows, for example, between the individual battery modules 21. Therefore, after the opening of the valve device 16 the extinguishing process runs automatically and autonomously here.

As result, here the battery fire can, in the best case, be completely prevented or suppressed at the earliest possible time. In the event of a crash it is therefore also possible to prevent or suppress a fire so that vehicle occupants and other road users or else rescue personnel are better protected. In addition, the repair costs are reduced by avoiding battery fires.

What is claimed:

1. A traction battery device for an at least partially electrically driven motor vehicle, said traction battery device comprising:
   at least one traction battery with at least one battery housing for housing battery modules and/or battery cells and at least one extinguishing apparatus for automatically carrying out an extinguishing process in an extinguishing situation,
   wherein the at least one extinguishing apparatus is configured to introduce at least one extinguishing agent into the battery housing via at least one feed device,
   wherein the extinguishing apparatus comprises at least one extinguishing-agent-generating device which is configured to combine at least two spatially separate extinguishing agent components in a controlled fashion and to mix the extinguishing agent components together to form an extinguishing agent which can be introduced into the battery housing via the feed device,
   wherein the extinguishing-agent-generating device comprises an extinguishing tank including (i) at least two extinguishing agent component spaces disposed in the tank which are sealed with respect to one another and from an outside, each extinguishing agent component space holding one of the extinguishing agent components, (ii) at least one mixing space which is sealed with respect to the extinguishing agent component spaces, and (iii) a valve positioned within the tank for selectively mixing within the mixing space the extinguishing agent components from the extinguishing agent component spaces,
   wherein the valve includes an inlet end that fluidly communicates with both of the at least two extinguishing agent component spaces and an outlet end that fluidly communicates with the at least one mixing space.

2. The traction battery device as claimed in claim 1, wherein the feed device comprises foam ducts and foam outlet units via which the extinguishing agent, in the form of an extinguishing foam, is introduced into the battery housing.

3. The traction battery device as claimed in claim 1, wherein the mixing space has a flow connection to the feed device in order to discharge the extinguishing agent via the feed device, wherein the mixing space is configured to be selectively connected to the extinguishing agent component spaces by the valve.

4. The traction battery device as claimed in claim 3, wherein the fluidic connection between the extinguishing agent component spaces is made only via the mixing space.

5. The traction battery device as claimed in claim 3, wherein the mixing space comprises at least one pipe-like mixing section for generating selective eddying in order to mix the extinguishing agent components.

6. The traction battery device as claimed in claim 3, wherein the mixing space is arranged within the extinguishing tank.

7. The traction battery device as claimed in claim 3, wherein the extinguishing agent components are configured to be transferred into and mixed in the mixing space by way of excess pressure applied to the extinguishing agent component spaces, and wherein, the extinguishing agent is configured to be introduced into the battery housing via the feed device by way of the excess pressure.

8. The traction battery device as claimed in claim 1, further comprising two of said valves, wherein the valves are respectively arranged at opposite ends of the mixing section, wherein each valve is fluidly connected to both of the extinguishing agent component spaces.

9. The traction battery device as claimed in claim 1, wherein the extinguishing-agent-generating device is attached to a housing wall and/or to a housing frame of the battery housing.

10. The traction battery device as claimed in claim 1, wherein the feed device is integrated into at least one housing wall and into a cover of the battery housing, and wherein the feed device includes extinguishing agent ducts and extinguishing agent outlet units that are arranged in said feed device.

11. The traction battery device as claimed in claim 1, wherein the feed device is configured to introduce in a selective fashion the extinguishing agent between the battery modules and/or battery cells within the battery housing.

12. The traction battery device as claimed in claim 1,
wherein the extinguishing apparatus comprises at least one control device which is configured to monitor an operating state of the traction battery by way of at least one sensor means,
wherein the extinguishing apparatus is configured to combine the extinguishing agent components by way of the extinguishing-agent-generating device when a critical operating state is detected, and
wherein the extinguishing apparatus is configured to initiate at the same time an extinguishing process which runs automatically and during which the extinguishing agent components are mixed to form an extinguishing agent which is capable of extinguishing, and
wherein the feed device is configured to direct the extinguishing agent into the battery housing in order to fight the fire.

13. The traction battery device as claimed in claim 1, wherein the feed device constitutes a cover for the battery housing.

14. The traction battery device as claimed in claim 13, wherein the feed device comprises meandering foam ducts that are arranged or formed on the cover.

15. The traction battery device as claimed in claim 14, wherein portions of the foam ducts are arranged in parallel on the cover.

16. The traction battery device as claimed in claim 13, wherein the battery housing includes a plurality of housing walls defining a receptacle space in which the battery modules and/or the battery cells is/are positioned, and wherein the cover closes off the receptacle space.

17. The traction battery device as claimed in claim 1, wherein the at least two extinguishing agent component spaces are isolated from one another by a wall that is disposed within an interior region of the tank.

18. A traction battery device for an at least partially electrically driven motor vehicle, said traction battery device comprising:
at least one traction battery with at least one battery housing for housing battery modules and/or battery cells and at least one extinguishing apparatus for automatically carrying out an extinguishing process in an extinguishing situation,
wherein the at least one extinguishing apparatus is configured to introduce at least one extinguishing agent into the battery housing via at least one feed device,
wherein the extinguishing apparatus comprises at least one extinguishing-agent-generating device which is configured to combine at least two spatially separate extinguishing agent components in a controlled fashion and to mix the extinguishing agent components together to form an extinguishing agent which can be introduced into the battery housing via the feed device,
wherein the extinguishing-agent-generating device comprises an extinguishing tank including (i) at least two extinguishing agent component spaces disposed in the tank which are sealed with respect to one another and from an outside, each extinguishing agent component space holding one of the extinguishing agent components, (ii) at least one mixing space which is sealed with respect to the extinguishing agent component spaces, and (iii) a valve positioned within the tank for selectively mixing within the mixing space the extinguishing agent components from the extinguishing agent component spaces,
wherein the mixing space has a flow connection to the feed device in order to discharge the extinguishing agent via the feed device, wherein the mixing space is configured to be selectively connected the extinguishing agent component spaces by the valve, and
wherein the mixing space extends partially into one of the extinguishing agent components spaces.

\* \* \* \* \*